United States Patent Office 3,549,601
Patented Dec. 22, 1970

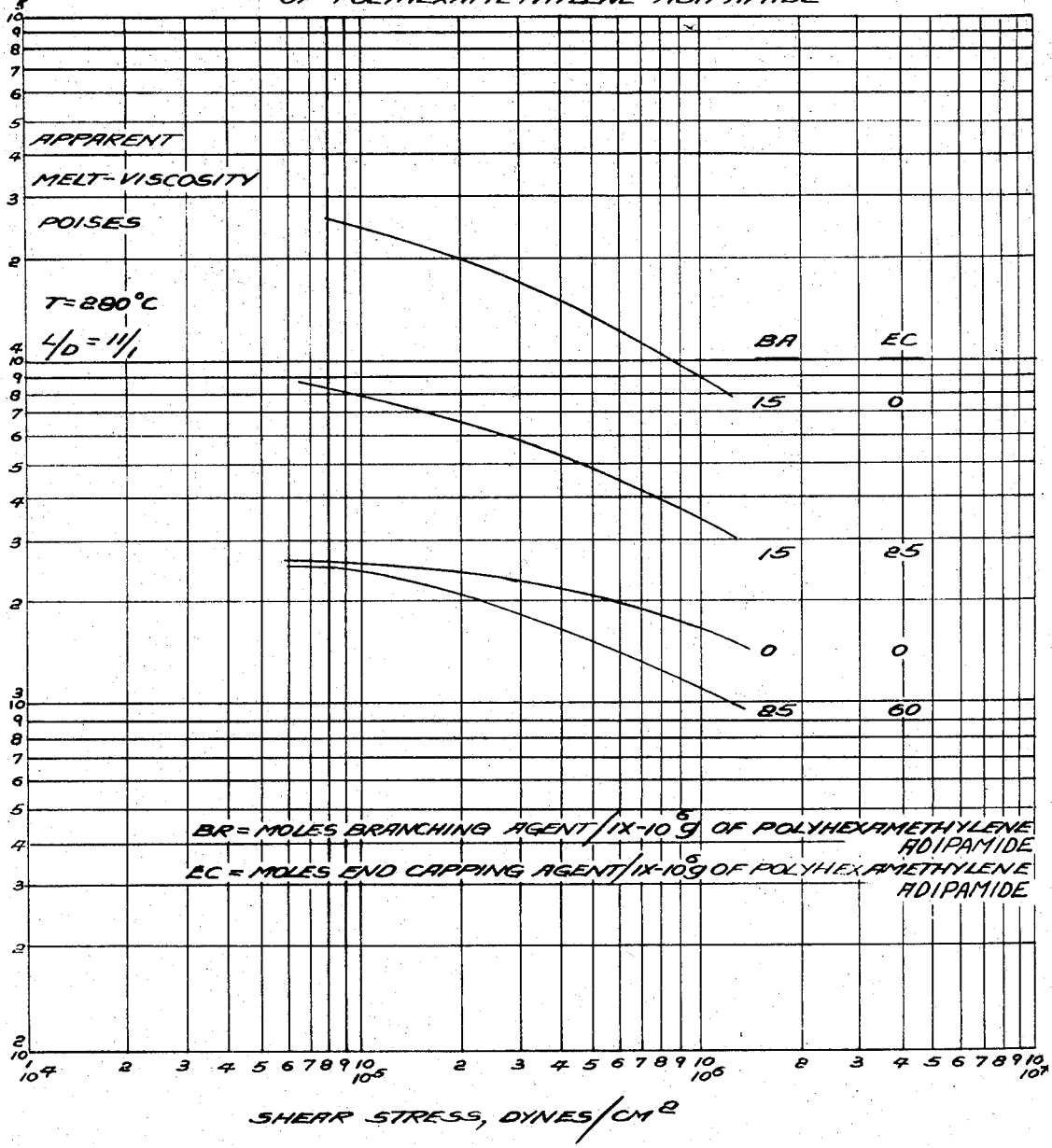

3,549,601
POLYAMIDE MOLDING RESIN OBTAINED BY POLYMERIZING POLYAMIDE PRECURSORS IN THE PRESENCE OF A CRITICAL PROPORTION OF END CAPPING AGENT: BRANCHING AGENT
Peter A. Fowell, 2300 Louisiana Ave., Parkersburg, W. Va. 26101
Filed Aug. 20, 1968, Ser. No. 754,051
Int. Cl. C08 20/38
U.S. Cl. 260—78  5 Claims

ABSTRACT OF THE DISCLOSURE

Polyamide molding resin obtained by polymerizing the precursor with a branching agent and an end-capping agent. The ratio of end-capping agent to branching agent must be between about 2 to 1 and 3 to 1. A critical amount of branching agent is required.

---

This invention relates to polyamide resins especially useful for injection molding processes. Polyamide resins of the art are not entirely satisfactory as injection molding resins due in part to the fact that they have a low viscosity when heated to above the melting point, thus the resins tend to drip and drool out of the nozzle of an injection molding machine between injections and due in part to the fact that the resins flow poorly in any restricted areas in the mold. The addition of branching agents to polyamides to increase viscosity is known in the art. The art also suggests adding an en-capping agent to polyamide polymerizations to control the molecular weight of the polyamide. U.S. Pat. No. 2,863,857 suggests preparing a polyamide using a branching agent and an end-capping agent in the same polymerization reaction.

It is an object of the present invention to produce a polyamide resin that when heated to a temperature above its melting point has a viscosity sufficiently high that there is little or no nozzle drool, and when the molten polyamide is subjected to high stress, as when it is being injected into a restricted passage in a mold by an injection molding machine, the resin fills the mold rapidly. Stated another way, an object of the invention is to eliminate nozzle drool while at the same time improving the flow properties of the resin as it is being injected.

The above object is fulfilled by modification of the polyamide molecular structure. This modification is achieved by synthesizing the polyamide from the conventional precursors, but in the presence of a critical amount of branching agent and a critical amount of end-capping agent. The branching agent must be present in the amount of .0565 to .321 mole percent based on the equivalents of acid present in the polyamide precursor. The mole ratio end-capping agent to branching agent must be between about 2 to 1 and 3 to 1.

The term precursor means the materials known in the art for producing high molecular weight polyamides by condensation reactions; such materials include mixtures of dicarboxylic acids and diamines, lactams, and aminocarboxylic acids mixed with small amounts of diamines or dicarboxylic acids. The term branching agent means a trifunctional amine or acid. The term end-capping agent means a monofunctional acid, or amine, amide forming anhydride, or cyclic urea forming diamine. Suitable precursors include hexamethylenediammonium adipamide, hexamethylenediammonium sebacamide, hexamethylenediammonium 1,12-dodecanediamide octamethylenediammonium adipamide, and the like. Suitable branching agents include bishexamethylenetriamine, and trimesic acid. Suitable end-capping agents include acetic acid, propionic acid, diethyl amine, dimethylamine, ethyl methyl amine, and the like.

The polyamide of the present invention may be produced by heating the polyamide precursor, the branching agent and the end-capping agent in an autoclave, while allowing the water formed to slowly escape. The polymerization techniques generally applied to the production of known polyamides may be employed.

In the following examples, all parts are by weight unless otherwise specified.

EXAMPLE I

A mixture of 116 parts by weight (or 1,000,000 gms.) of the salt formed from stoichiometrically equivalent quantities of hexamethylenediamine and adipic acid with 0.538 parts by weight (or 25 moles) of bishexamethylenetriamine and 0.360 parts by weight (or 60 moles) of acetic acid and an excess of water sufficient to prepare the mixture in solution are heated under pressure in an autoclave allowing the water to escape slowly. The pressure is slowly reduced to atmospheric pressure, and the polymer thus formed is held at one atmosphere of steam at 280° C. for 30 minutes. It is then extruded and cut. This is Polymer I.

Other poly(hexamethylene adipamides) are made exactly as described above but with different amounts of branching agent (Br=moles of branching agent/$1 \times 10^6$ g. of polymer) and end-capping agent (EC=moles of end-capping agent/$1 \times 10^6$ g. of polymer). The polymers are described in Table I.

TABLE I.—SUMMARY OF 66-NYLONS

| Polymer | Br | EC |
|---|---|---|
| I | 25 | 60 |
| II | 15 | 25 |
| III | 15 | 0 |
| IV | 0 | 0 |

The melt viscosity-shear stress relationship for these polymers is described in FIG. 1. The consistently higher melt viscosities of Polymers II and III compared to the linear Polymer IV over the full practical range of shear stress is readily apparent. Polymer II involves an EC/Br ratio of 1.67/1. Only the composition of this invention, with an EC/Br ratio of 2.4/1, has a lower melt viscosity at higher shear stress than the linear polymer: Polymer I.

In order to demonstrate the utility of Polymer I, molding tests are carried out in a 3 oz. Fellows ram injection molding machine. Using maximum cylinder pressure with cylinder temperature settings from front to rear of 343° C. (i.e. 650° F.) to 316° C. (i.e. 600° F.) and a mold temperature of 77° C. (i.e. 170° F.), the cycle time required to just fill a plaque mold $3'' \times 6'' \times 0.05''$ is determined. The mold can be filled in a total cycle time of 32 seconds. As a control, the same test is carried out using the linear 66 nylon, Polymer IV. A total cycle time of 48 seconds is required.

Flow tests are carried out using the above molding machine. Using a snakeflow mold with a thickness of 100 mils, Polymer I fills to a length of 29.5 inches at maximum injection pressure, a cylinder temperature of 332° C. (i.e. 630° F.) to 354° C. (i.e. 670° F.), front to rear and a cycle time of 25 seconds. The control Polymer IV is subjected to the same test, and a flow length of only 22.5 inches is observed.

A further test in the above molding machine is carried out to determine the minimum pressure required to fill the 50 mil plaque mold. With a 48 second overall cycle and using Polymer I, the die can be filled using a ram pressure of only 18,500 p.s.i. The control Polymer IV requires 20,000 p.s.i. in the same test.

Mechanical properties are determined for the above (Polymer I) resin with a capping agent to branching agent ratio of 2.4 to 1 and are shown to be similar to those of the linear unmodified (Polymer IV) resin when molded and tested under the same conditions. The properties are given in Table II.

The elongation at fracture of Polymers I–IV are indicated in Table III.

TABLE II.—PROPERTIES OF POLYMER WITH BRANCHING AND END-CAPPING

|  | Polymer IV | Polymer I |
|---|---|---|
| Branching (moles/10⁶g.) | 0 | 25 |
| End-capping (moles/10⁶ g.) | 0 | 60 |
| Flexural modulus,¹ dry (M p.s.i.), 50% RH | {408 / 172 | 390 / 175 |
| Yield strength (M p.s.i.), dry, 50% RH | {12.1 / 7.8 | 11.8 / 7.7 |
| Ultimate strength (M p.s.i.) dry, 50% RH | {8.0 / 10.5 | 8.1 / 7.2 |
| Elongation,² dry, 50% RH | {15–55 / 217–310 | 25–40 / 75–290 |
| Tensile impact,³ dry, (S type×1/16) | 86 | 82 |
| Tensile Impact, −40° C. (average), dry | 60 | 60 |
| Izod impact ⁴ (notched), ft-lb./in.² | 0.9 | 0.9 |
| Low temperature brittleness,⁵ ° C | −74 | −69 |
| Modulus/temp., M p.s.i.: |  |  |
| 75° C | 86 | 110 |
| 100° C | 70 | 83 |
| 150° C | 53 | 60 |
| 200° C | 40 | 46 |
| Fatigue limit,⁶ p.s.i., 50% RH | 2,050 | 2,350 |

¹ ASTM D-790.
² ASTM D-638.
³ ASTM D-1822.
⁴ ASTM D-256.
⁵ ASTM D-746.
⁶ Fatigue limit is determined by using a Sonntag-Universal machine at constant stress levels. The number refers to the stress at which failure will not occur for at least 1×10⁶ cycles when subjected to alternating axial tension and compression at 1,900 cycles per minute.

TABLE III.—ULTIMATE ELONGATION

| Polymer | Br | EC | Range, percent elongation, dry (as mold) |
|---|---|---|---|
| I | 25 | 60 | 25–40 |
| II | 15 | 25 | 26–63 |
| III | 15 | 0 | 72–178 |
| IV | 0 | 0 | 15–55 |

It is apparent that Polymer III which is branched but not end-capped has high elongation, but this polymer has excessive high melt viscosity as shown earlier in FIG. 1. Addition of end-capping agent as in Polymer II lowers elongation but does not lower melt viscosity sufficiently. Only Polymer I has properties analogous to the control Polymer IV as is fully shown in Table II while having superior mold filling behavior because of its low melt viscosity at high shear stress as shown in FIG. 1.

I claim:

1. A molding resin formed by heating a branching agent selected from the class consisting of trimesic acid and bishexamethylenetriamine and an end-capping agent selected from the class consisting of acetic acid, propionic acid, diethyl amine, dimethylamine and ethyl methyl amine, together with a polyamide precursor selected from the class consisting of aminocarboxylic acids mixed with small amounts of diamines or dicarboxylic acids, lactams mixed with small amounts of diamines or dicarboxylic acids, and mixtures of dicarboxylic acids and diamines, the mole ratio of end-capping agent to branching agent being between about 2 to 1 and about 3 to 1, the branching agent being present in the amount of about .0565 to .321 mole percent based on the equivalents of acid in the precursor.

2. The resin of claim 1 in which the branching agent is trimesic acid.

3. The resin of claim 1 in which the branching agent is bishexamethylenetriamine.

4. The resin of claim 1 in which the end-capping agent is acetic acid.

5. In a process for producing polyamide molding resin, the improvement which comprises polymerizing the polyamide precursor selected from the class consisting of aminocarboxylic acids mixed with small amounts of diamines or dicarboxylic acids, lactams mixed with small amounts of diamines or dicarboxylic acids, and mixtures of dicarboxylic acids and diamines in the presence of an end-capping agent selected from the class consisting of acetic acid, propionic acid, diethyl amine, dimethylamine and ethyl methyl amine and a branching agent selected from the class consisting of trimesic acid and bishexamethylenetriamine, the mole ratio of end-capping agent to branching agent being between about 2 to 1 and about 3 to 1, the branching agent being present in the amount of about .0565 to .321 mole percent based on the equivalents of acid in the precursor.

References Cited

UNITED STATES PATENTS

| 2,252,555 | 8/1941 | Carothers | 260—78 |
| 2,863,857 | 12/1958 | Costain et al. | 260—78 |
| 3,304,289 | 2/1967 | Ballentine et al. | 260—78 |

FOREIGN PATENTS

| 570,858 | 7/1945 | United Kingdom | 260—78 |
| 749,479 | 5/1956 | United Kingdom | 260—78 |

WILLIAM SHORT, Primary Examiner

H. SCHAIN, Assistant Examiner

U.S. Cl. X.R.

264—328, 331

UNITED STATES PATENT OFFICE
CERTIFICATE OF CORRECTION

Patent No. 3,549,601           Dated December 22, 1970

Inventor(s) Peter A. Fowell

It is certified that error appears in the above-identified patent and that said Letters Patent are hereby corrected as shown below:

In the heading to the printed specification, after line 8, insert -- assignor to E. I. du Pont de Nemours and Company, Wilmington, Del., a corporation of Delaware --.

Signed and sealed this 25th day of May 1971.

(SEAL)
Attest:

EDWARD M. FLETCHER, JR.  
Attesting Officer

WILLIAM E. SCHUYLER, JR.  
Commissioner of Patents